United States Patent
Grunschloss et al.

(10) Patent No.: US 9,430,863 B1
(45) Date of Patent: Aug. 30, 2016

(54) SYSTEM, METHOD, AND COMPUTER PROGRAM PRODUCT FOR CONSTRUCTING A HIERARCHICAL ACCELERATION DATA STRUCTURE THAT SUPPORTS RAY TRACING OF MOTION BLUR

(75) Inventors: Leonhard Grunschloss, Wellington (NZ); Martin Stich, Berlin (DE); Sehera Nawaz, Wellington (NZ); Alexander Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 295 days.

(21) Appl. No.: 13/283,341

(22) Filed: Oct. 27, 2011

(51) Int. Cl.
*G06T 15/50* (2011.01)
*G06T 15/06* (2011.01)

(52) U.S. Cl.
CPC .................................. *G06T 15/06* (2013.01)

(58) Field of Classification Search
CPC ...... G06T 15/00; G06T 19/00; G06T 15/005
USPC ................................................. 345/419, 426
See application file for complete search history.

(56) References Cited

U.S. PATENT DOCUMENTS

| | | | | |
|---|---|---|---|---|
| 5,809,219 | A * | 9/1998 | Pearce et al. | 345/426 |
| 7,233,328 | B2 * | 6/2007 | Christensen et al. | 345/423 |
| 8,471,845 | B1 | 6/2013 | Stich | |
| 2009/0167763 | A1 | 7/2009 | Waechter et al. | |
| 2013/0249915 | A1 * | 9/2013 | Stich | 345/426 |

FOREIGN PATENT DOCUMENTS

WO     WO 2009063319 A2 *  5/2009

OTHER PUBLICATIONS

Glassner, Andrew S. "Spacetime ray tracing for animation." Computer Graphics and Applications, IEEE 8.2 (1988): 60-70.*
Amanatides, J., et al., "A fast voxel traversal algorithm for ray tracing," In in Eurographics, 1987, vol. 87, pp. 3-10.
Apodaca, T. et al., "Using RenderMan in animation production," ACM SIGGRAPH 1995 Course 4, Aug. 7, 1995, www.renderman.org/RMR/Publications/sig95.course04.pdf.
Christensen, P., "Ray tracing for the movie 'Cars'," In Proceedings of the IEEE Symposium on Interactive Ray Tracing 2006, 2006, pp. 1-6.
Hanika, J. et al., "Two-level ray tracing with reordering for highly complex scenes," In Proceedings of Graphics Interface 2010, 2010, pp. 145-152.
Hou, Q. et al., "Micropolygon ray tracing with defocus and motion blur," In ACM SIGGRAPH 2010 papers, pp. 64:1-64:10.
Hunt, W., "Corrections to the surface area metric with respect to mail-boxing," In Proceedings of the IEEE Symposium on Interactive Ray Tracing 2008, 2008, pp. 77-80.

(Continued)

*Primary Examiner* — Xiao Wu
*Assistant Examiner* — Whitney Pointe
(74) *Attorney, Agent, or Firm* — Zilka-Kotab, PC

(57) ABSTRACT

A system, method, and computer program product are provided for constructing a hierarchical acceleration data structure that supports ray tracing of motion blur. In use, scene description data associated with an image to be generated is received. Additionally, a hierarchical acceleration data structure for performing ray tracing on the scene description data is constructed, where the hierarchical acceleration data structure supports ray tracing of motion blur.

19 Claims, 4 Drawing Sheets

(56) References Cited

OTHER PUBLICATIONS

Lauterbach, C. et al., "RT-DEFORM: Interactive ray tracing of dynamic scenes using BVHs," Symposium on Interactive Ray Tracing, 2006, pp. 39-46.

Munkberg, J. et al., "Efficient bounding of displaced Bezier patches," 2010, pp. 1-10.

Olsson, J., "Ray-Tracing Time-Continuous Animations using 4D KD-Trees," Master's thesis, Lund University, Apr. 21, 2007, pp. 1-30.

Pharr, M. et al., "Physically Based Rendering: From Theory to Implementation," Morgan Kaufmann Publishers Inc., 2nd edition, pp. 1-1167.

Soupikov, A., et al., "Improving kd-tree quality at a reasonable construction cost," IEEE/EG Symposium on Interactive Ray Tracing 2008,, Aug. 9-10, 2007, pp. 67-72.

Stich, M. et al., "Spatial splits in bounding volume hierarchies," In Proceedings of the Conference on High Performance Graphics 2009, 2009, pp. 7-13.

Sutherland, I. et al., "Reentrant polygon clipping," Graphics and Image Processing, Communications of the ACM, vol. 17, No. 1, Jan. 1974, pp. 32-42.

Wachter, C. et al., "Terminating spatial hierarchies by a priori bounding memory," In Proceedings of the IEEE Symposium on Interactive Ray Tracing, 2007, pp. 41-46.

Wald, I. et al., "State of the art in ray tracing animated scenes," In Eurographics 2007 State of the Art Reports, 2007, pp. 1-28.

Wald, I. et al., "On building fast kd-Trees for Ray Tracing, and on doing that in O(N log N)," In Proceedings of the IEEE Symposium on Interactive Ray Tracing, 2006, pp. 61-69.

Dammertz, H. et al., "The Edge Volume Heuristic—Robust Triangle Subdivision for Improved BVH Performance," IEEE Symposium on Interactive Ray Tracing, 2008, 155-158.

Ernst, M. et al., "Early Split Clipping for Bounding Volume Hierarchies," Proceedings Eurographics/ IEEE Symposium on Interactive Ray Tracing, 2007, 73-78.

Glassner, A. S., "Spacetime Ray Tracing for Animation," IEEE Computer Graphics & Applications, 1988, pp. 60-70.

Shevtsov, M. et al., "Highly Parallel Fast KD-tree Construction for Interactive Ray Tracing of Dynamic Scenes," Eurographics, 2007, vol. 26, No. 3, pp. 395-404.

Wald, I., "On fast Construction of SAH-based Bounding Volume Hierarchies," In Proceedings of the 2007 Eurographics/IEEE Symposium on Interactive Ray Tracing, 2007, pp. 1-8.

Non-Final Office Action from U.S. Appl. No. 12/533,922, dated Jul. 19, 2012.

Notice of Allowance from U.S. Appl. No. 12/533,922, dated Nov. 29, 2012.

Stich, M., U.S. Appl. No. 12/533,922, filed Jul. 31, 2009.

Non-Final Office Action from U.S. Appl. No. 13/900,475, dated Oct. 15, 2013.

Final Office Action from U.S. Appl. No. 13/900,475, dated Mar. 13, 2014.

Notice of Allowance from U.S. Appl. No. 13/900,475, dated Aug. 25, 2014.

\* cited by examiner

SYSTEM, METHOD, AND COMPUTER PROGRAM PRODUCT FOR CONSTRUCTING A HIERARCHICAL ACCELERATION DATA STRUCTURE THAT SUPPORTS RAY TRACING OF MOTION BLUR

FIELD OF THE INVENTION

The present invention relates to rendering images, and more particularly to performing ray tracing.

BACKGROUND

Traditionally, ray tracing has been used to enhance a visual realism of generated images. For example, ray tracing may be used to generate a displayed image by tracing paths of light through the pixels of the image plane. However, current techniques for performing ray tracing have been associated with various limitations.

For example, current methods for performing ray tracing may inadequately address the simulation of motion blur in generated images. More specifically, hierarchies may be used that exhibit large overlap between bounding volumes, which may result in inefficient traversals while performing ray tracing.

There is thus a need for addressing these and/or other issues associated with the prior art.

SUMMARY

A system, method, and computer program product are provided for constructing a hierarchical acceleration data structure that supports ray tracing of motion blur. In use, scene description data associated with an image to be generated is received. Additionally, a hierarchical acceleration data structure for performing ray tracing on the scene description data is constructed, where the hierarchical acceleration data structure supports ray tracing of motion blur.

DETAILED DESCRIPTION

Figure 1:
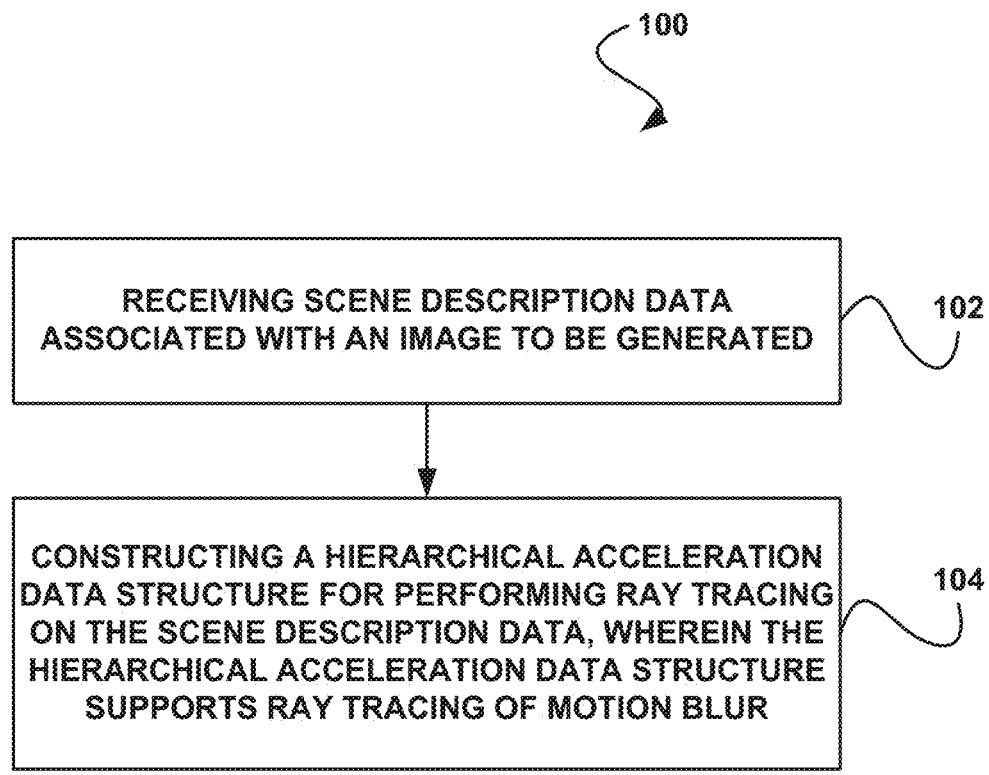
FIG. 1 shows a method for constructing a hierarchical acceleration data structure that supports ray tracing of motion blur, in accordance with one embodiment.

FIG. 1 shows a method 100 for constructing a hierarchical acceleration data structure that supports ray tracing of motion blur, in accordance with one embodiment. As shown in operation 102, scene description data associated with an image to be generated is received. In one embodiment, the scene description data may include any data that represents one or more elements of the image. For example, the scene description data may include a description of a scene to be displayed, geometry associated with the scene, one or more objects within the scene, a lighting of the scene, etc. In another embodiment, the scene description data may be received from a data store such as a database, server, hard drive, etc.

Additionally, as shown in operation 104, a hierarchical acceleration data structure for performing ray tracing on the scene description data is constructed, where the hierarchical acceleration data structure supports ray tracing of motion blur. In one embodiment, the hierarchical acceleration data structure may include a bounding volume hierarchy (BVH). For example, the hierarchical acceleration data structure may partition a list of objects within the scene description data. In another embodiment, motion blur may include blurring of a viewed image due to motion (e.g., motion of an object while a shutter of a camera is open, etc.).

Further, in one embodiment, the hierarchical acceleration data structure may include a splitting bounding volume hierarchy (SBVH). For example, the hierarchical acceleration data structure may perform spatial partitioning to a BVH. In another embodiment, the hierarchical acceleration data structure may include a motion splitting bounding volume hierarchy (MSBVH). For example, the hierarchical acceleration data structure may interpolate node bounding boxes and may also perform spatial partitioning.

Further still, in one embodiment, the hierarchical acceleration data structure may include an SBVH constructed for a midpoint of a determined shutter interval. For example, a shutter interval (e.g., an interval associated with a simulated opening and closing of a camera shutter, etc.) may be associated with the scene description data in order to support a photorealistic simulation of the ray tracing performed on the scene description data. In another example, the shutter may determined to be open for one unit of time, and may therefore have an interval of [0,1]. In yet another example, if the determined shutter interval is [0,1], the midpoint of the shutter interval may be 0.5.

Also, in one embodiment, the hierarchical acceleration data structure may include a hierarchy of nodes. For example, the hierarchical acceleration data structure may include a tree structure containing a plurality of nodes. In another embodiment, n+1 bounding boxes may be computed for each node in the hierarchy of nodes. For example, each node in the hierarchy of nodes may store n+1 bounding boxes, where each bounding box may correspond to a point in time of the determined shutter interval.

In addition, in one embodiment, computing the n+1 bounding boxes for each node of the hierarchical acceleration data structure may include computing bounding boxes for a first node corresponding to the midpoint of the determined shutter interval. In another embodiment, computing the n+1 bounding boxes for each node of the hierarchical acceleration data structure may include determining bounding boxes of leaf nodes of the first node. For example, a clipped primitive may be determined at the midpoint of the determined shutter interval by intersecting each primitive referenced in a leaf node with a bounding box of the leaf node. In another example, the clipped primitive may then be transformed for the bounding boxes corresponding to the beginning and end points of the shutter interval. In another embodiment, the transformation may be propagated up the hierarchical acceleration data structure.

In this way, the hierarchical acceleration data structure may efficiently support adjusting to a time within the determined shutter interval while performing accelerated ray tracing. Additionally, ray traced motion blur may be computed faster and more efficiently.

Further, in one embodiment, one or more instances may be used in constructing the hierarchical acceleration data structure. For example, the hierarchical data structure may include a directed acyclic graph, and one or more parts of the hierarchy of the acceleration data structure may be referenced multiple times. In another embodiment, construction of the hierarchical acceleration data structure may be sped up by pre-sorting a primitive index array of the data structure. For example, the primitive index array may be pre-sorted according to primitive centroids.

Further still, in one embodiment, a traversal order of the hierarchical acceleration data structure may be determined according to a parametric distance of a ray-bounding box intersection associated with the hierarchical acceleration data structure. In another embodiment, multiple motion segments may be used for ray tracing of a single frame. For example, multiple motion segments may be used in cases of non-linear motion.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
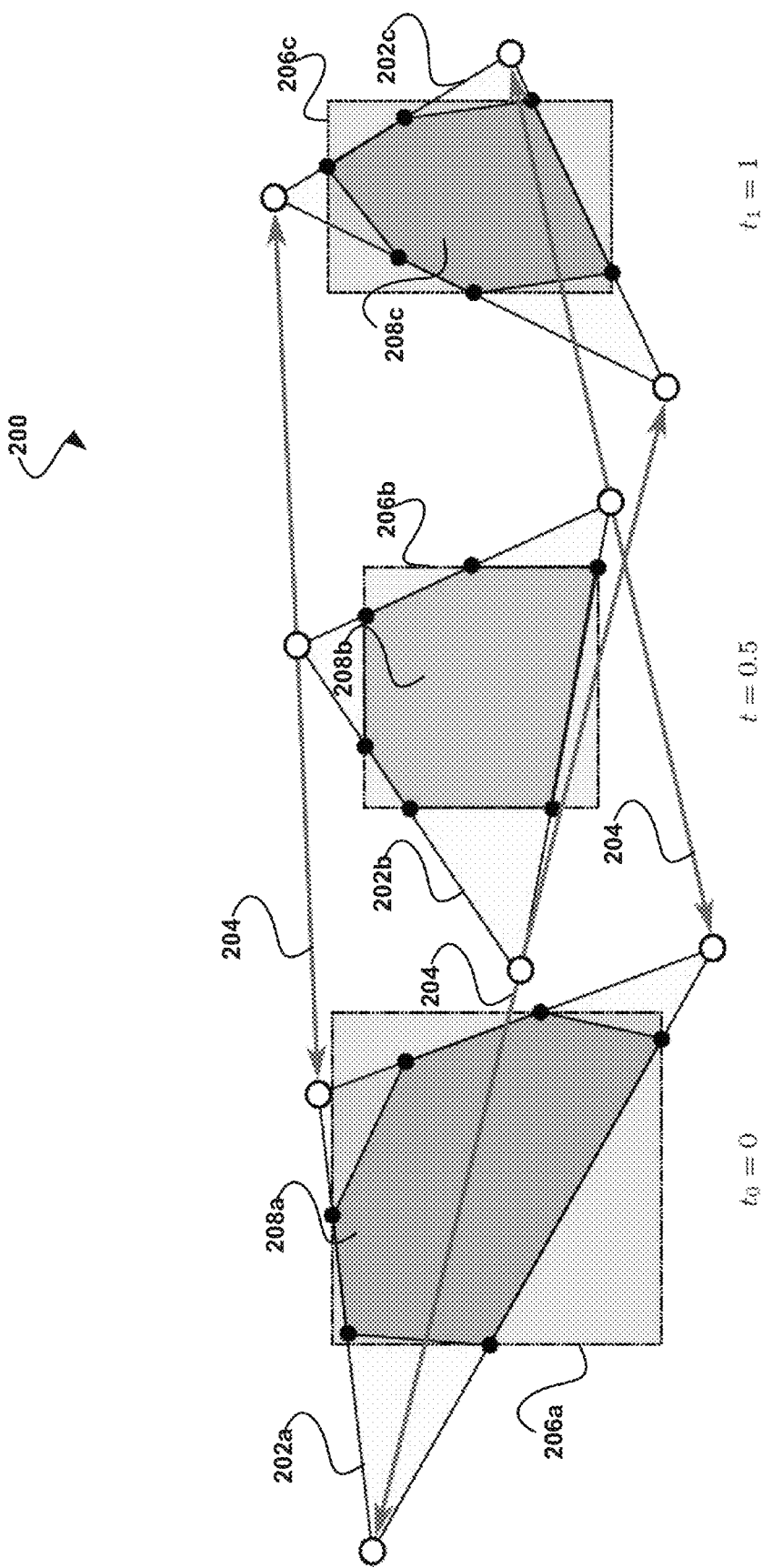
FIG. 2 shows a transformation of a clipped primitive during construction of an MSBVH, in accordance with another embodiment.

FIG. 2 shows the transformation 200 of a clipped primitive during construction of an MSBVH, in accordance with another embodiment. As an option, the transformation 200 may be carried out in the context of the functionality of FIG. 1. Of course, however, the transformation 200 may be implemented in any desired environment. It should also be noted that the aforementioned definitions may apply during the present description.

As shown, a triangle primitive 202a-c is shown in linear motion during a shutter interval [0,1]. Triangle primitive 202a is shown at time $t_0=0$, triangle primitive 202b is shown at time $t=0.5$, and triangle 202c is shown at time $t_1=1$. Additionally, the linear motion of the triangle primitive 202a-c is shown by motion segments 204. Further, at time $t=0.5$, a bounding box 206b of a leaf node of a hierarchical data structure is shown together with triangle primitive 202b as it results from a SBVH hierarchy construction algorithm for $t=0.5$.

In one embodiment, the construction of the topology of the MSBVH may be the same as the construction of a topology of an SBVH built for $t=0.5$ in a camera shutter interval [0, 1]. In another embodiment, in order to enable temporal interpolation, each hierarchy node may store n+1 volumes. For example, each volume may correspond to a single time instant $t_i$ for i=0, n. In another embodiment, for the example of linear motion from $t_0=0$ to $t_1=1$, two bounding boxes may need to be stored in each node, which may bound the respective endpoints of the motion segments.

Additionally, in one embodiment, BVHs may use axis-aligned bounding boxes as bounding volumes. In another embodiment, BVHs may be well suited for rendering scenes with motion blur, since during traversal the bounding boxes of the hierarchy may be interpolated according to the ray time. This may result in much tighter bounds than intersecting with the bounding box of a moving primitive containing the complete motion path.

In another embodiment, a bounding volume hierarchy may partition the list of objects, while a kd-tree may partition space. In yet another embodiment, the SBVH may add spatial partitioning to BVHs. See, for example, "Spatial splits in bounding volume hierarchies," (Stich et al., In Proceedings of the Conference on High Performance Graphics 2009, ACM, New York, N.Y., USA, HPG '09, 7-13), which is hereby incorporated by reference in its entirety, and which describes the splitting bounding volume hierarchy (SBVH). In still another embodiment, these spatial splits may significantly reduce the overlap of node bounding boxes for many scenes, which may reliably increase rendering performance.

Further still, due to spatial splits, parts of the triangle primitive 202b have been clipped by the bounding box 206b, which results in the clipped primitive 208b (e.g., the polygon region within the bounding box 206b). Also, the clipped primitive 208b is transformed to bounding box 206a at time $t_0=0$ and is bounded to extend the bounding box 206a to form clipped primitive 208a. Additionally, the clipped primitive 208b is transformed to bounding box 206c at time $t_1=1$ and is bounded to extend the bounding box 206c to form clipped primitive 208c. In one embodiment, the bounding boxes 206a and 206c may be interpolated during traversal.

Additionally, in one embodiment, the construction of the MSBVH may include the computation of n+1 bounding boxes of each node. For example, given the SBVH bounding boxes, which may correspond to time $t=0.5$, the bounding boxes of the leaf nodes may be determined, where each primitive 202b referenced in an SBVH leaf may be intersected with the leaf's bounding box 206b. This may result in the clipped primitive 208b, which may then be transformed for each $t_i$.

In another embodiment, the bounding box $B_i$ of all of the leaf's transformed clipped primitives may constitute the MSBVH leaf bounding box at time $t_i$. In still another embodiment, the bounds may be propagated up the hierarchy. In this way, MSBVH may support the efficient ray tracing of motion blur by interpolating node bounding boxes, while at the same time reducing node overlap using spatial splits.

Further, in one embodiment, besides linear interpolation, the construction may allow the use of any convex combination to find the bounding box to be intersected with a ray at time t. Table 1 illustrates a exemplary bounding box B(t). Of course, it should be noted that the bounding box shown in Table 1 is set forth for illustrative purposes only, and thus should not be construed as limiting in any manner. In another embodiment, the operations may be performed componentwise and the weights $0 \leq w_i \leq 1$ may sum up to one.

TABLE 1

| $B(t) = \Sigma_{i=0}^n w_i(t) B_i$ |
| --- |

Further still, in one embodiment, primitives may be clipped and the results may be transformed in order to determine the leaf bounding boxes of the MSBVH. For example, if the primitives include triangles, the triangles may be clipped against the clipping box using a Sutherland-Hodgman algorithm. See, for example, "Reentrant polygon clipping," (Sutherland et al., Commun. ACM 17 (January), 32-42), which is hereby incorporated by reference in its entirety, and which describes the Sutherland-Hodgman algorithm.

In another embodiment, for the vertices of the resulting polygon, the barycentric coordinates ($\alpha$, $\beta$, $\gamma$) may be computed with respect to their unclipped triangle (a, b, c). These may be found by repeatedly solving a 2×2 linear system for each vertex p of the clipped triangle polygon. Table 2 illustrates an exemplary linear system. Of course, it should be noted that the linear system shown in Table 2 is set forth for illustrative purposes only, and thus should not be construed as limiting in any manner.

TABLE 2

$\alpha \cdot a + \beta \cdot b + \gamma \cdot c = p$
or equivalently, since $\alpha = 1 - \beta - \gamma$,
$a + \beta \cdot (c - a) + \gamma \cdot (b - a) = p$ Further, in one embodiment, the exemplary linear system may include an overconstrained 3×3 linear system that may be reduced to a 2×2 system matrix. See, for example, "Physically Based Rendering: From Theory to Implementation, 2nd edition," (Pharr et al., Morgan Kaufmann Publishers Inc., San Francisco, Calif., USA), which is hereby incorporated by reference in its entirety, and which describes techniques for reducing a linear system.

Further still, in one embodiment, the three triangle vertices may be transformed according to time $t_i$. Additionally, the barycentric coordinates may be used to compute the transformed polygon vertices, which may be used to extend the axis-aligned leaf bounding box for time $t_i$. In another embodiment, after extending all n+1 bounding boxes, the polygon data may be discarded. This procedure may tightly bound the transformed area of the clipped and transformed triangle.

In another embodiment, with respect to axis-aligned bounding boxes, the bounding box of the primitive intersected with the clipping box may be transformed. The resulting bounding boxes may not be as tight compared to clipping the primitive. Table 3 illustrates an exemplary interpolated clipped bounding box at $t_i$. Of course, it should be noted that the interpolated clipped bounding box shown in Table 3 is set forth for illustrative purposes only, and thus should not be construed as limiting in any manner. In yet another embodiment, all vector operations may be performed elementwise.

TABLE 3

Given the primitive bounding box $[b_{min}, b_{max}]$ at t = 0.5, its transformed counterpart $[f_{min}, f_{max}]$ at $t_i$, and the bounding box of the primitive intersected with the clipping box $[c_{min}, c_{max}]$, $$\left[ f_{min} + \frac{c_{min} - b_{min}}{b_{max} - b_{min}} \cdot (f_{max} - f_{min}), f_{min} + \frac{c_{max} - b_{min}}{b_{max} - b_{min}} \cdot (f_{max} - f_{min}) \right]$$

Figure 3:
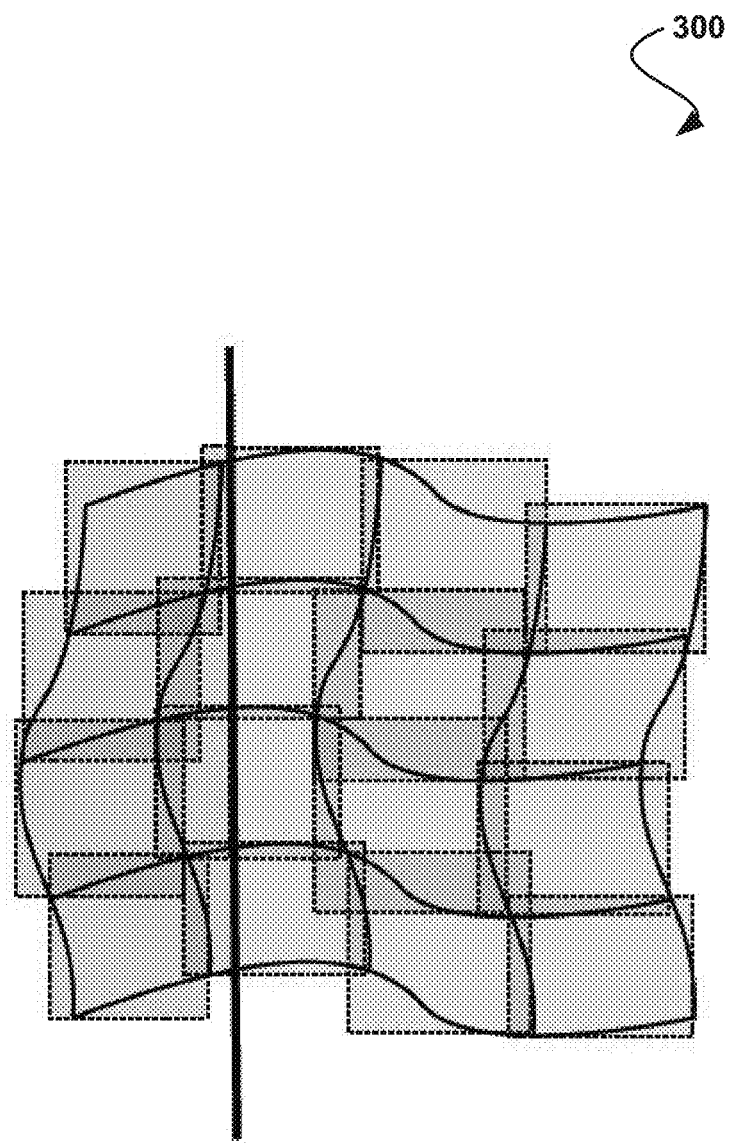
FIG. 3 shows results of approximating a complicated patch by more than one bounding box, in accordance with yet another embodiment.

Additionally, in one embodiment, with respect to complex shapes, resorting to using only bounding boxes may not be efficient for parametric surfaces and multi-resolution surfaces (e.g., displacement mapped subdivision surfaces, etc.). In these cases, the elements resulting from parametric or regular tessellation may be bounded. FIG. 3 shows results 300 of approximating a complicated patch by more than one bounding box, in accordance with one embodiment. In this way, parts of the patch that belong to a left and right child may be conservatively determined as a consequence of a spatial split.

Further, see, for example, "Two-level ray tracing with reordering for highly complex scenes," (Hanika et al., Proceedings of Graphics Interface 2010, Canadian Information Processing Society, Toronto, Ont., Canada, Canada, GI '10, 145-152), and "Efficient bounding of displaced Bézier patches," (Munkberg et al., Proceedings of the Conference on High Performance Graphics, Eurographics Association, Aire-la-Ville, Switzerland, Switzerland, HPG '10, 153-162), which are hereby incorporated by reference in their entirety, and which describe techniques for bounding elements resulting from parametric or regular tesselation.

Further still, in one embodiment, the resulting bounding boxes may be handled as described hereinabove. In another embodiment, the bounding box of a node may be determined by the bounds of the clipped boxes of all elements in that node. Alternatively, it may be possible to avoid clipping the elements' bounding boxes. However, this may not result in an exact spatial split and may lead to larger bounding boxes. In this way, the bounding boxes obtained with refinement may be much tighter than without and may enable a more precise approximation of the SAH.

Also, in one embodiment, instances may reduce scene complexity and hierarchy construction times. For example, instead of a tree, a directed acyclic graph may be used, where parts of the hierarchy may be referenced multiple times. In another example, such a reference may contain a transformation matrix A(t) that may depend on the time t and may be the frame of the referenced geometry. In yet another example, when a ray is intersected with such a node, it may be transformed to the frame of the instance by applying the inverse transformation matrix.

In another embodiment, in the context of animation, an important question may be how to find a tight bounding box of an animated instance during hierarchy construction. See, for example, "Physically Based Rendering: From Theory to Implementation, 2nd edition," (Pharr et al., Morgan Kaufmann Publishers Inc., San Francisco, Calif., USA), incorporated by reference hereinabove in its entirety, which describes techniques for finding a bounding box.

In another example, A(t) may be sampled at discrete times $t_i$ to determine a bounding box, but temporally continuous mapping $A^{-1}(t)$ may be applied to transform the ray. In another embodiment, an approach may determine conservative bounding boxes for hierarchy construction. For example, in order to enable interpolation, the n+1 bounding boxes of an MSBVH node may be determined by bounding the instance using the frame $A_i := A(t_i)$. In another example, tighter bounding boxes may be achieved by transforming the instance geometry, while transforming the bounding box of the instance is faster, but not as tight in general.

Additionally, in another example, the resulting instance bounding boxes may be processed as described hereinabove. In one embodiment, the primitives of individual instance hierarchies may still be clipped and transformed as described hereinabove. In another embodiment, conservative ray intersection may require approximation of the transformation. For example, during hierarchy traversal, the bounding boxes may be interpolated in exactly the same way as described in the algorithm hereinabove. When reaching the leaf that holds the instance, the matrices may be interpolated analogously to the bounding boxes.

Table 4 illustrates an exemplary interpolation of the matrices. Of course, it should be noted that the interpolation shown in Table 4 is set forth for illustrative purposes only, and thus should not be construed as limiting in any manner.

TABLE 4

$A'(t) = \Sigma_{i=0}^{n} w_i(t) A_i$.

Further, in one embodiment, the ray may be transformed using the inverse of the interpolated transformation matrix before traversing the instance-level MSBVH. In another embodiment, individual factored matrices resulting from a matrix decomposition are not interpolated into scale, rotation, and translation components. Instead, the individual matrix elements may be interpolated, which may result in splines that may match the interpolation of the instance bounding boxes. This may guarantee that no geometry of the instance may be missed.

Table 5 illustrates an exemplary linear interpolation with equidistant times $t_i$. Of course, it should be noted that the interpolation shown in Table 5 is set forth for illustrative purposes only, and thus should not be construed as limiting in any manner. In one embodiment, for arbitrary $t_i$, a binary search may be used to locate the corresponding motion segment.

TABLE 5

For the example of linear interpolation with equidistant times $t_i := i/n$, first the fraction $\lambda = n \cdot t - i$ inside the motion segment $i = \lfloor n \cdot t \rfloor$ is determined. Then the ray is transformed using the inverse of $A'(\lambda) := (1 - \lambda) \cdot A_i + \lambda \cdot A_{i+1}$.

Further still, in one embodiment, mail-boxing may be applied in order to avoid intersecting a ray more than once with the same instance. See, for example, "A fast voxel traversal algorithm for ray tracing," (Amanatides et al., In Eurographics 87, 3-10), incorporated by reference in its entirety, which describes techniques for applying mail-boxing.

In another embodiment, it may be possible to queue a fixed number of instance intersections along the ray. See, for example, "Two-level ray tracing with reordering for highly complex scenes," (Hanika et al., In Proceedings of Graphics Interface 2010, Canadian Information Processing Society, Toronto, Ont., Canada, Canada, GI '10, 145-152), incorporated by reference hereinabove in its entirety, which describes techniques for queuing a fixed number of instance intersections along a ray. In yet another embodiment, this queue then may be sorted to remove duplicates before performing further intersections.

Also, in one embodiment, in the above context the mail-boxing maybe accounted for when evaluating the SAH. See, for example, "Corrections to the surface area metric with respect to mail-boxing," (Hunt, In Proceedings of the IEEE Symposium on Interactive Ray Tracing 2008, 77-80), incorporated by reference in its entirety, which describes techniques for accounting for mail-boxing when evaluating an SAH. In another embodiment, while instancing may substantially reduce memory requirements and hierarchy construction time, it may not reduce the overlap among instances. Thus, there may be cases where replacing the directed acyclic graph by its corresponding tree may result in superior performance.

In another embodiment, bounding volume hierarchy construction cost may be amortized across frames by keeping the hierarchy topology, updating leaf bounding boxes, and propagating the results up the hierarchy. See, for example, "State of the art in ray tracing animated scenes," (Wald et al., In Eurographics 2007 State of the Art Reports, 2007), incorporated by reference in its entirety, which describes techniques for amortizing bounding volume hierarchy construction cost. In yet another embodiment, refitting may be complemented by a heuristic which may trigger rebuilds for degenerated parts of the hierarchy. See, for example, "RT-DEFORM: Interactive ray tracing of dynamic scenes using BVHs," (Lauterbach et al., Symposium on Interactive Ray Tracing, 2006, 39-46), incorporated by reference in its entirety, which describes techniques for triggering rebuilds for degenerated hierarchy parts.

In addition, in one embodiment, in order to refit a leaf bounding box for the MSBVH, clipped primitives may be taken into account. For example, for a subsequent frame, each primitive may be re-clipped against the corresponding leaf bounding box of the hierarchy at the previous frame's shutter closing time. In this way, no additional geometry or hierarchy data may need to be stored.

Further, in one embodiment, acceleration hierarchy construction may be sped up by pre-sorting the primitive index array, for example according to primitive centroids. See, for example, "On building fast kd-trees for ray tracing, and on doing that in O(N log N)," (Wald et al., In Proceedings of the IEEE Symposium on Interactive Ray Tracing 2006, 61-69), incorporated by reference in its entirety, which describes techniques for pre-sorting primitive index arrays. In another embodiment, when primitives are split spatially, the centroids of the resulting references may need to be recomputed. In yet another embodiment, the sorting order of the reference index array may not be invalidated due to spatial splits.

For example, for each spatial split, a list of those primitives in the node that are duplicated due to a spatial split may be kept. In another example, centroids for those primitives may be recomputed, this array may be sorted, and a merge-sort step may be used to combine this array with the array of unsplit primitives.

Further still, in one embodiment, relying on one spatial split at a single time instant for the whole shutter interval may requires coherent motion. In another embodiment, even with this assumption fulfilled, primitives in one node may move into opposite directions with respect to a spatial split plane and change bounding boxes. Therefore, in one embodiment, instead of using the split plane for determining the hierarchy traversal order, it may be more efficient to determine the traversal order according to the parametric distance of the ray bounding box intersection.

Also, in one embodiment, using a single motion segment may not be a sufficient approximation for non-linear motion (e.g., a rotating propeller, etc.). In such cases multiple motion segments may be used for a single frame. In another embodiment, restricting the number of motion segments to $2^m$ with equidistant times $t_i = i/2^m$ may allow for the efficient determination of bounding boxes in case children in the hierarchy use different numbers of time samples. In yet another embodiment, the power-of-two restriction may guarantee that the existing motion segment endpoints for the children coincide, as only the maximum number of segments of the children may be taken and the children may be resampled with a smaller number of motion segments.

In this way, increasing the number of motion segments arbitrarily may be avoided when propagating bounding boxes from children to parents. For example, if arbitrary numbers of motion segments were allowed, the parent node of four children with 2, 3, 5, and 7 motion segments may need 2*3*5*7=210 motion segments to accurately represent the children's transformation interpolations without approximations. In one embodiment, this number may be equal to the least common multiple, which may motivate restricting the number of motion segments to powers of two.

Additionally, in one embodiment, nodes may be spatially partitioned during tree construction in order to reduce overlap in the presence of moving objects. The resulting hierarchies may be significantly cheaper to traverse than those generated by classic approaches. In another embodiment, the MSBVH may enable each ray to be traced at a time within the camera's shutter interval. In yet another embodiment, the MSBVH may support adjusting to that time in a very efficient way, thereby allowing for faster ray traced motion blur.

Figure 4:
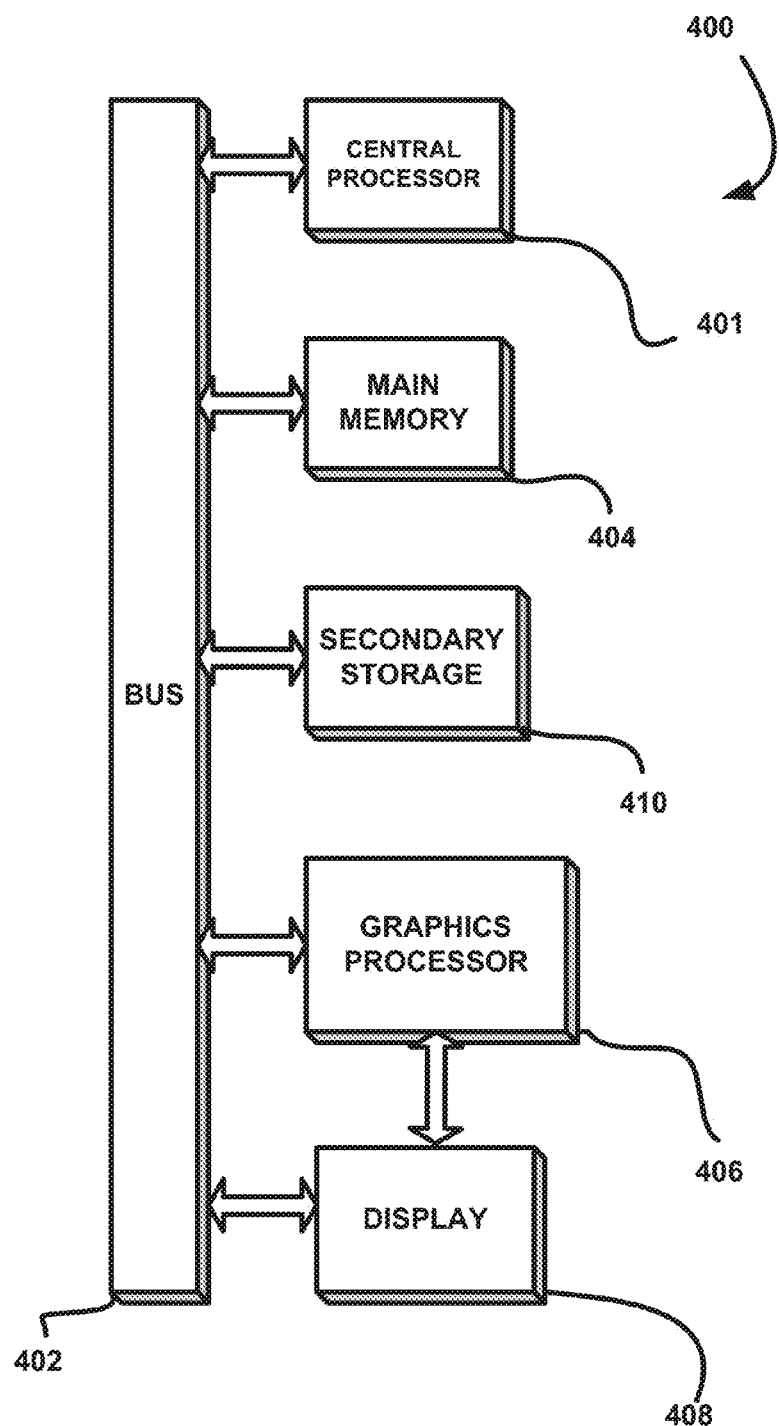
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. In yet another embodiment, the platform may be realized as reconfigurable logic, which, for example, may include Field Programmable Gate Arrays (FPGA).

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving scene description data including triangle primitives associated with an image to be generated, wherein the scene description data includes a tree structure containing a plurality of nodes;
determining a plurality of node bounding boxes for the plurality of nodes, each node bounding box associated with a node of a hierarchical acceleration data structure in a memory, comprising:
interpolating vertices of a triangle primitive at a start of a shutter interval and at an end of the shutter interval to generate interpolated vertices at a point in time within the shutter interval, the interpolated vertices defining an interpolated triangle primitive that intersects a first node bounding box of the plurality of node bounding boxes;
transforming the interpolated triangle primitive to produce a second node bounding box corresponding to the start of the shutter interval; and
transforming the interpolated triangle primitive to produce a third node bounding box corresponding to the end of the shutter interval, wherein the second node bounding box and the third node bounding box bound endpoints of a motion segment; and
storing the second node bounding box and the third node bounding box for the first node of the hierarchical acceleration data structure, the first node referencing the triangle primitive.

2. The method of claim 1, wherein the hierarchical acceleration data structure includes a motion splitting bounding volume hierarchy (MSBVH).

3. The method of claim 1, wherein the hierarchical acceleration data structure is constructed based on a spatial partitioning.

4. The method of claim 1, wherein the hierarchical acceleration data structure includes a splitting bounding volume hierarchy (SBVH) constructed for a midpoint of the shutter interval.

5. The method of claim 1, wherein the shutter interval includes an interval associated with a simulated opening and closing of a camera shutter that is associated with the scene description data in order to support a photorealistic simulation of the ray tracing performed on the scene description data.

6. The method of claim 1, wherein the hierarchical acceleration data structure comprises a hierarchy of nodes including the node.

7. The method of claim 1, wherein the hierarchical acceleration data structure comprises a tree structure containing a plurality of nodes including the node.

8. The method of claim 1, wherein each node bounding box associated with the node corresponds to a different point in time within the shutter interval.

9. The method of claim 1, wherein the transformation is propagated up the hierarchical acceleration data structure.

10. The method of claim 1, wherein the hierarchical data structure is constructed based on a directed acyclic graph, and one or more parts of a hierarchy of the acceleration data structure are referenced multiple times.

11. The method of claim 1, wherein a traversal order of the hierarchical acceleration data structure is determined according to a parametric distance of a ray-bounding box intersection associated with the hierarchical acceleration data structure.

12. The method of claim 1, wherein the point in time within the shutter interval is a midpoint of the shutter interval.

13. The method of claim 1, further comprising traversing the hierarchical acceleration data structure to perform motion blur operations.

14. The method of claim 1, further comprising interpolating the second and third node bounding boxes according to a time associated with a ray to produce a fourth node bounding box.

15. The method of 1, further comprising, prior to transforming the interpolated triangle primitive, clipping the interpolated triangle primitive by the first bounding box.

16. A computer program product embodied on a non-transitory computer readable medium, comprising:
 code for receiving scene description data including triangle primitives associated with an image to be generated, wherein the scene description data includes a tree structure containing a plurality of nodes;
 code for determining a plurality of node bounding boxes for the plurality of nodes, each node bounding box associated with a node of a hierarchical acceleration data structure in a memory, comprising:
  code for interpolating vertices of a triangle primitive at a start of a shutter interval and at an end of the shutter interval to generate interpolated vertices at a point in time within the shutter interval, the interpolated vertices defining an interpolated triangle primitive that intersects a first node bounding box of the plurality of node bounding boxes;
  code for transforming the interpolated triangle primitive to produce a second node bounding box corresponding to the start of the shutter interval; and
  code for transforming the interpolated triangle primitive to produce a third node bounding box corresponding to the end of the shutter interval, wherein the second node bounding box and the third node bounding box bound endpoints of a motion segment; and
 code for storing the second node bounding box and the third node bounding box for the first node of the hierarchical acceleration data structure, the first node referencing the triangle primitive.

17. The computer program product of claim 16, further comprising code to interpolate the second and third node bounding boxes according to a time associated with a ray to produce a fourth node bounding box.

18. A system, comprising:
 a processor for receiving scene description data including triangle primitives associated with an image to be generated, wherein the scene description data includes a tree structure containing a plurality of nodes, the processor configured to:
 determine a plurality of node bounding boxes for the plurality of nodes, each node bounding box associated with a node of a hierarchical acceleration data structure in a memory, by:
 interpolating vertices of a triangle primitive at a start of a shutter interval and at an end of the shutter interval to generate interpolated vertices at a point in time within the shutter interval, the interpolated vertices defining an interpolated triangle primitive that intersects a first node bounding box of the plurality of node bounding boxes;
 transforming the interpolated triangle primitive to produce a first bounding box corresponding to the start of the shutter interval; and
 transforming the interpolated triangle primitive to produce a third node bounding box corresponding to the end of the shutter interval, wherein the second node bounding box and the third node bounding box bound endpoints of a motion segment; and
 store the second node bounding box and the third node bounding box for the first node of the hierarchical acceleration data structure, the first node referencing the triangle primitive.

19. The system of claim 18, wherein the processor is further configured to interpolate the second and third node bounding boxes according to a time associated with a ray to produce a fourth node bounding box.

* * * * *